United States Patent
Murase et al.

(10) Patent No.: US 7,971,025 B2
(45) Date of Patent: Jun. 28, 2011

(54) METHOD AND APPARATUS FOR CHUNK ALLOCATION IN A THIN PROVISIONING STORAGE SYSTEM

(75) Inventors: Atsushi Murase, Sunnyvale, CA (US); Akira Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 504 days.

(21) Appl. No.: 11/717,630

(22) Filed: Mar. 14, 2007

(65) Prior Publication Data
US 2008/0229048 A1    Sep. 18, 2008

(51) Int. Cl.
*G06F 12/00* (2006.01)
(52) U.S. Cl. .................................. 711/173; 711/161
(58) Field of Classification Search .................. 711/173, 711/114, 171, 172, 153, 161; 709/214, 215
See application file for complete search history.

(56) References Cited

U.S. PATENT DOCUMENTS

| | | | |
|---|---|---|---|
| 5,893,139 A * | 4/1999 | Kamiyama | 711/117 |
| 6,275,898 B1 * | 8/2001 | DeKoning | 711/114 |
| 6,636,958 B2 * | 10/2003 | Abboud et al. | 711/173 |
| 7,143,105 B2 * | 11/2006 | Nakano et al. | 707/102 |
| 2002/0103967 A1 * | 8/2002 | Brower et al. | 711/114 |
| 2003/0065898 A1 * | 4/2003 | Flamma et al. | 711/165 |
| 2004/0162958 A1 * | 8/2004 | Kano et al. | 711/170 |
| 2005/0138284 A1 * | 6/2005 | Cohn et al. | 711/114 |
| 2006/0080505 A1 * | 4/2006 | Arai et al. | 711/114 |
| 2007/0233868 A1 * | 10/2007 | Tyrrell et al. | 709/226 |
| 2007/0239793 A1 * | 10/2007 | Tyrrell et al. | 707/200 |

* cited by examiner

*Primary Examiner* — Jared I Rutz
(74) *Attorney, Agent, or Firm* — Mattingly & Malur, PC

(57) ABSTRACT

Physical storage space in a storage system is not allocated to a segment of a targeted volume until the segment of the volume is first targeted for storing write data. When write data is received, the storage system determines whether the targeted volume is designated for storing a first data type that is accessed frequently by I/O operations or designated for storing a second data type that is accessed less frequently than the first data type. Physical storage space for storing the write data is allocated from a first logical partition of the physical storage designated for storing the first data type when the targeted volume is of the first data type and from a second logical partition of the physical storage designated for storing the second data type when the targeted volume is of the second data type. Allocation of frequently accessed data is controlled and performance bottlenecking avoided.

20 Claims, 13 Drawing Sheets

Process to Write Data to Unallocated Area of a Thin Provisioned Volume

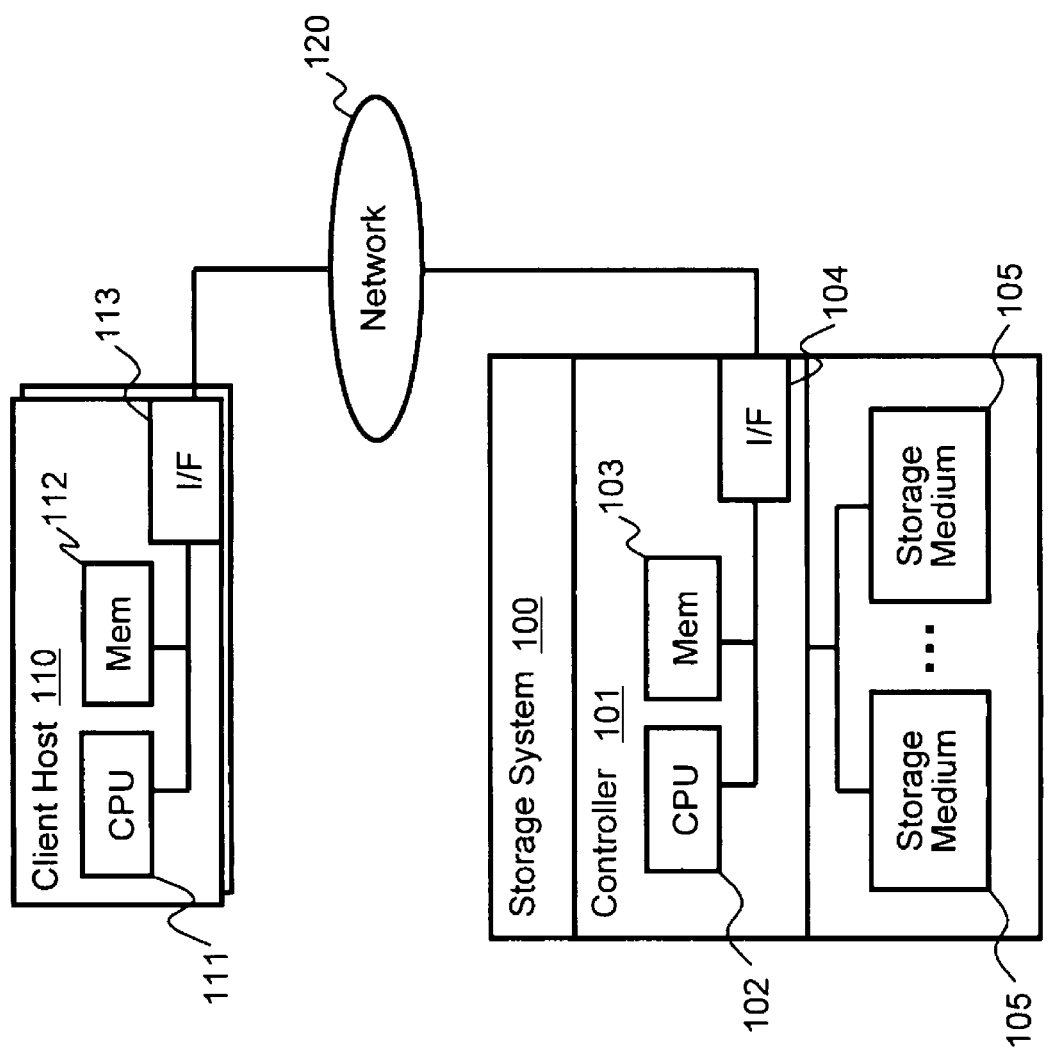
FIG. 1 Hardware Architecture

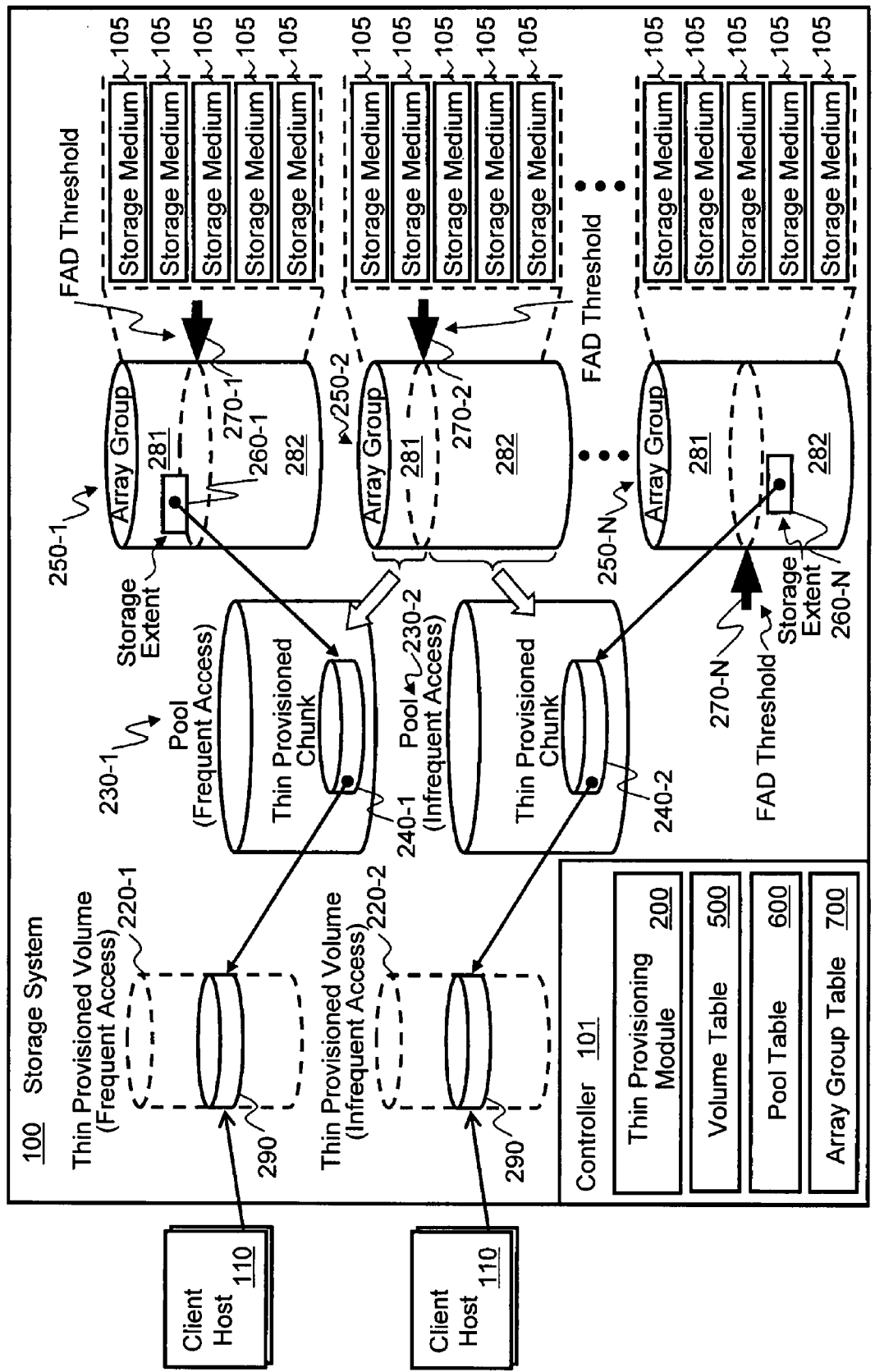
FIG. 2 Logical Element Structure

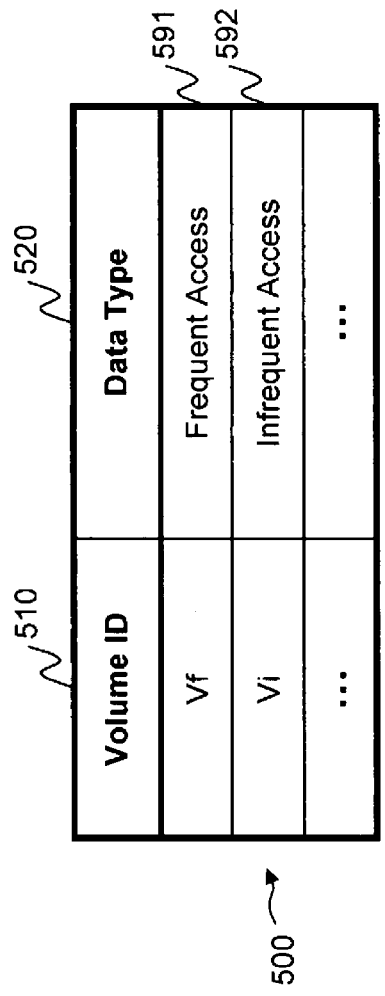
FIG. 3 Data Structure of Volume Table
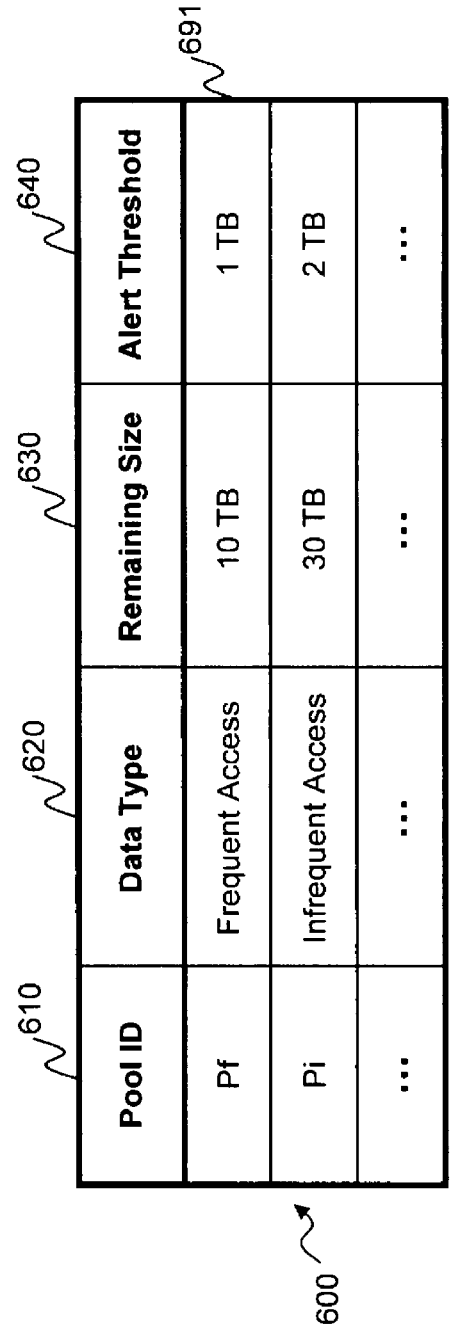
FIG. 4 Data Structure of Pool Table

| Array Group ID /710 | Total Size /720 | Frequent Access Data Threshold /730 | Size of Frequent Access Data /740 | Size of Infrequent Access Data /750 |
|---|---|---|---|---|
| A1 | 4 TB | 25% | 400 GB | 1,500 GB |
| A2 | 2 TB | 10% | 150 GB | 1,200 GB |
| A3 | 1 TB | 25% | 10 GB | 300 GB |
| ... | ... | ... | ... | ... |

FIG. 5 Data Structure of Array Group Table

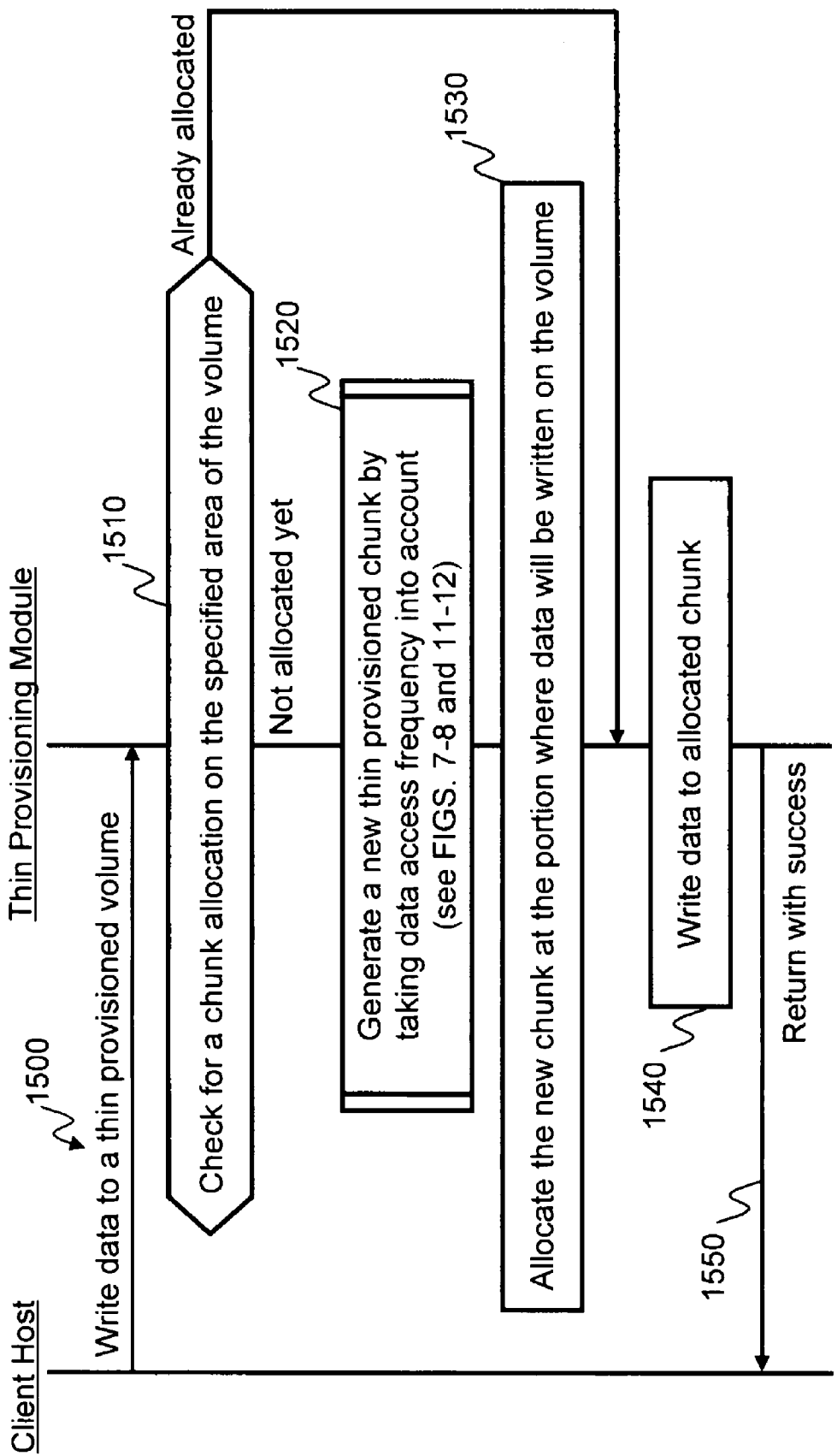
FIG. 6 Process to Write Data to Unallocated Area of a Thin Provisioned Volume

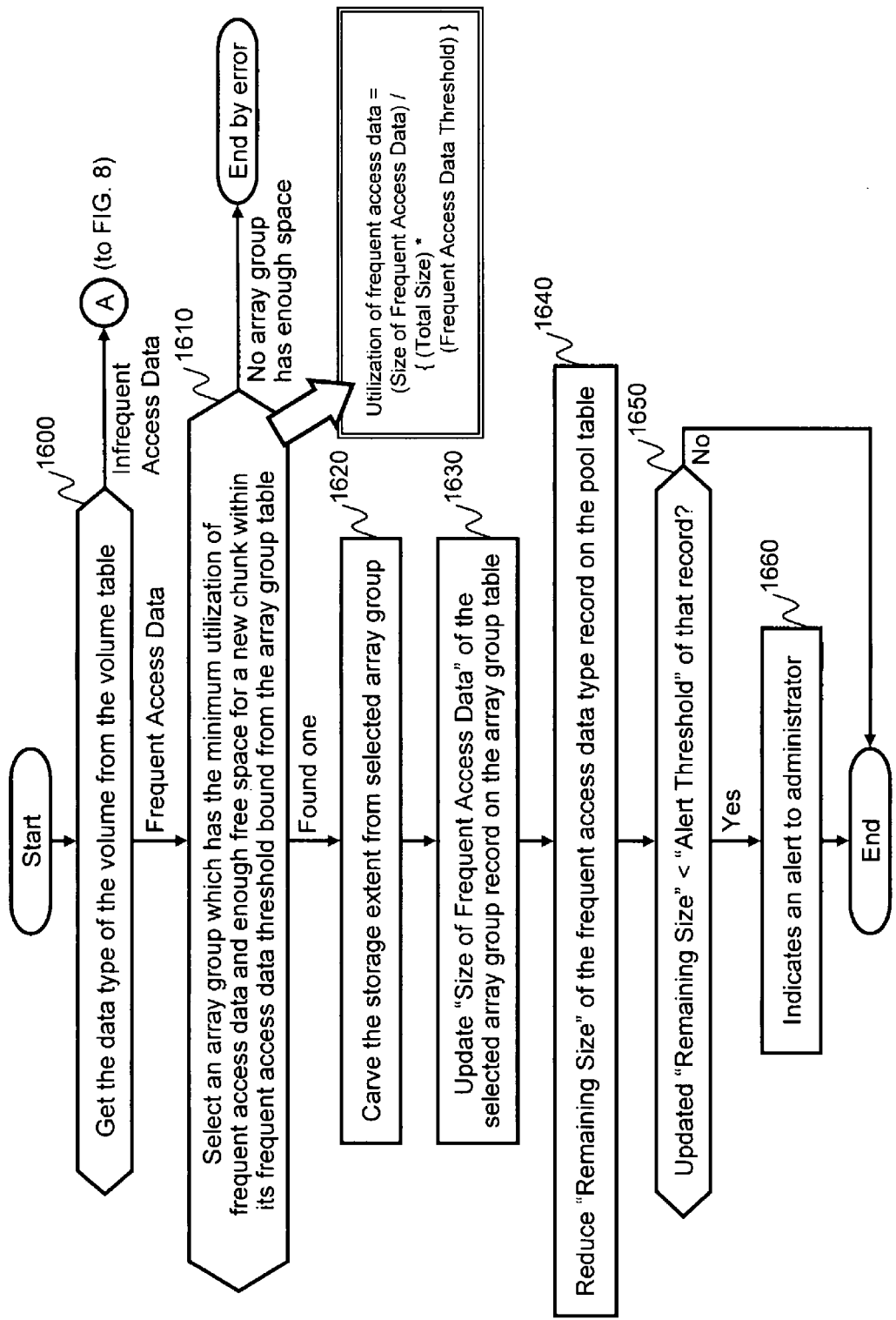
FIG. 7 Process to Generate Thin Provisioned Chunk

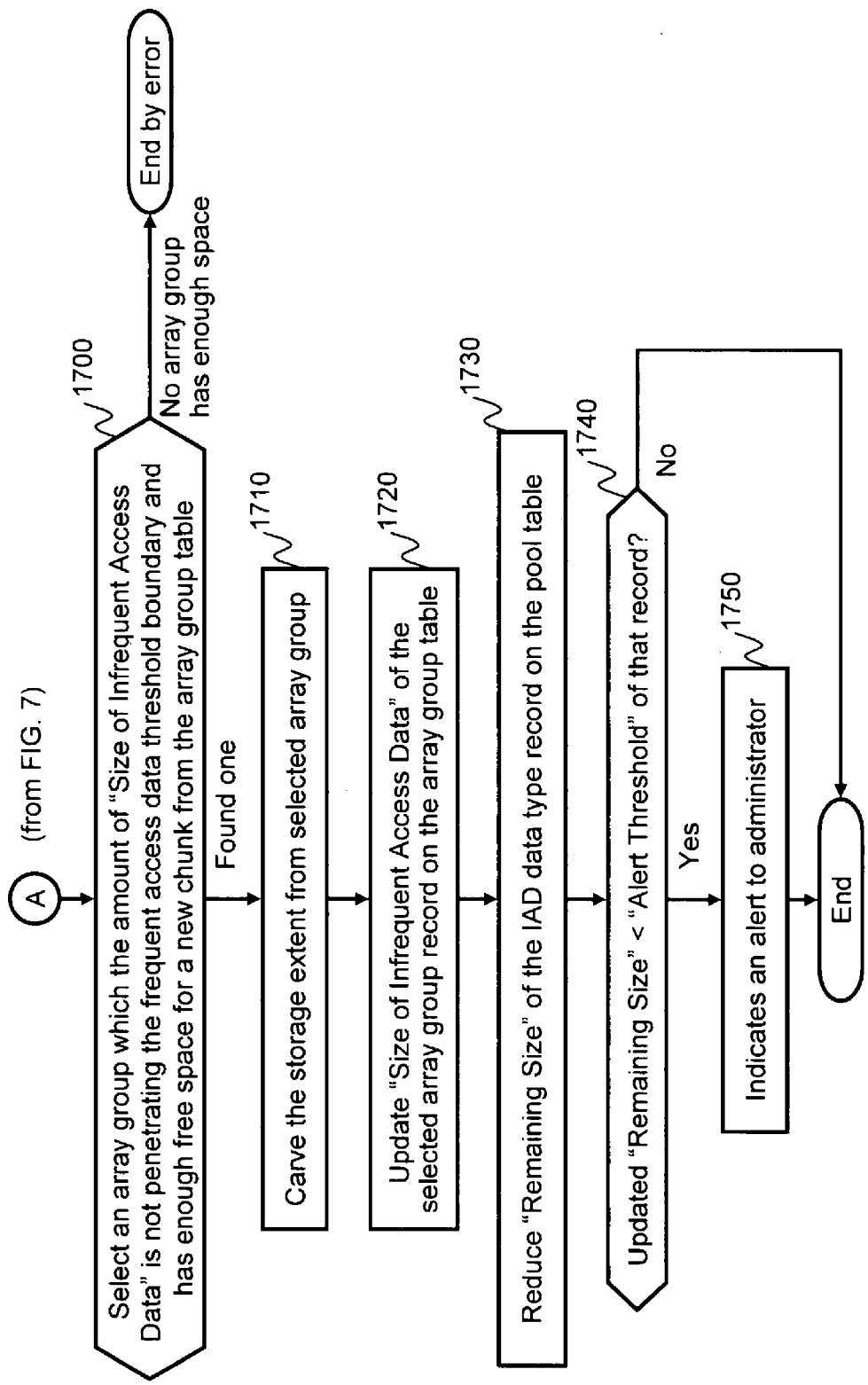
FIG. 8 Process to Generate Thin Provisioned Chunk (cont.)

| Array Group ID | Total Size | Max I/O Usage Ratio | Size of Frequent Access Data | Size of Infrequent Access Data |
|---|---|---|---|---|
| A1 | 4 TB | 65% | 400 GB | 1,500 GB |
| A2 | 2 TB | 50% | 150 GB | 1,200 GB |
| A3 | 1 TB | 5% | 10 GB | 300 GB |
| ... | ... | ... | ... | ... |

FIG. 9 Data Structure of Array Group Table

| Pool ID | Data Type | Alert Threshold |
|---|---|---|
| Pf | Frequent Access | 1 TB |
| Pi | Infrequent Access | 2 TB |
| ... | ... | ... |

FIG. 10 Data Structure of Pool Table

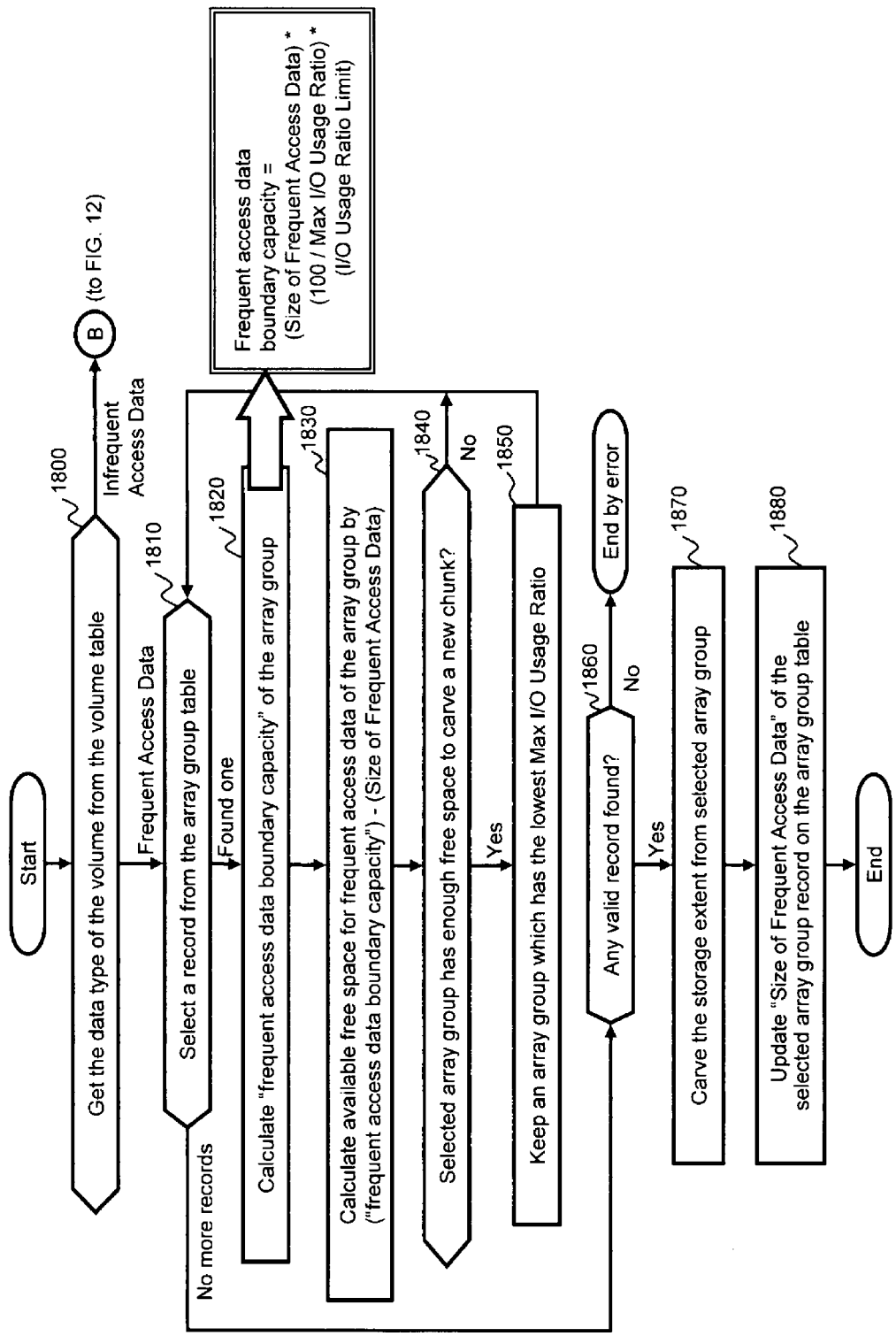
FIG. 11 Process to Generate Thin Provisioned Chunk

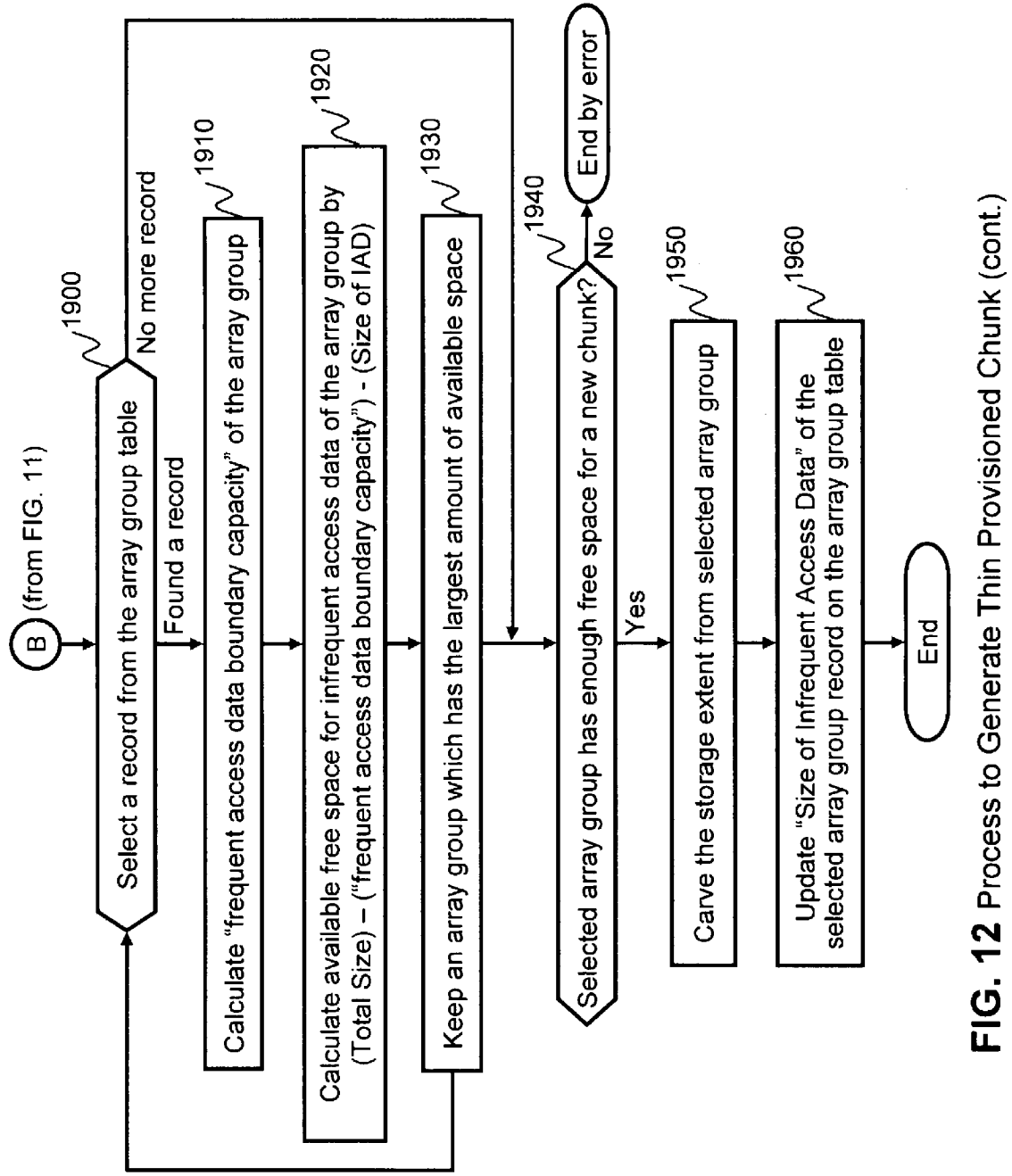
FIG. 12 Process to Generate Thin Provisioned Chunk (cont.)

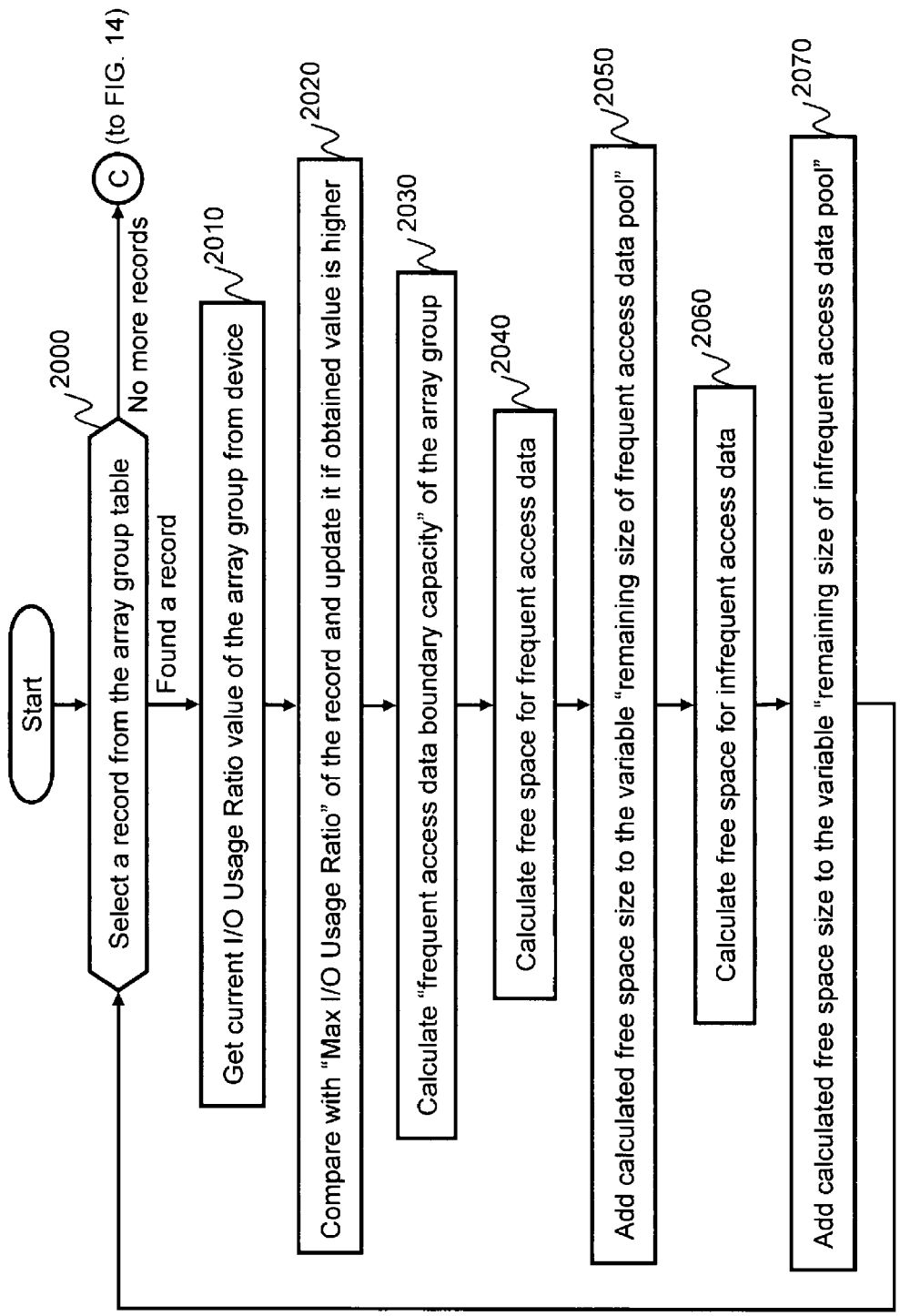
FIG. 13 Process to Update Max I/O Usage Ratio of Array Groups and Indicating Warning

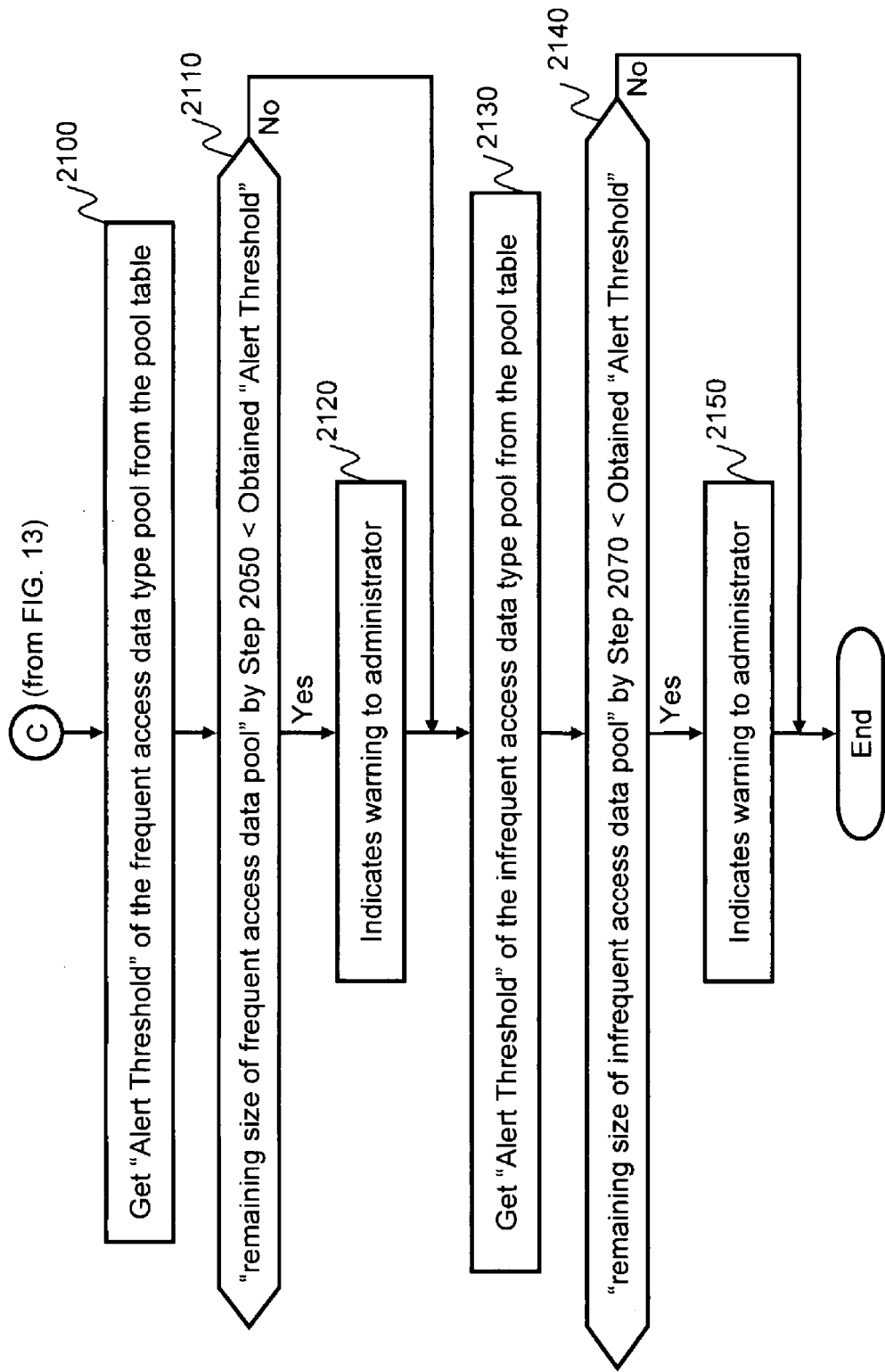
FIG. 14 Process to Update Max I/O Usage Ratio of Array Groups and Indicating Warning (cont.)

METHOD AND APPARATUS FOR CHUNK ALLOCATION IN A THIN PROVISIONING STORAGE SYSTEM

BACKGROUND OF THE INVENTION

1. Field of the Invention

The present invention relates generally to storage systems for storing data.

2. Description of Related Art

Thin Provisioned Storage

The amount of enterprise data is growing by more than 60% every year in some industries. Thus, storage administrators in these industries are frequently required to add new storage capacity to their storage systems, which can be quite costly. Also, storage administrators are often required to reduce inefficient use of storage capacity in the systems that they manage due to budget restrictions. To help solve these problems a technology has emerged that is known as a "thin provisioning storage system". Thin provisioning is an allocation-on-use technology that enables storage space to be allocated to users on a just-enough or just-in-time basis, rather than pre-allocating to users large storage spaces that may not ever be utilized.

A thin provisioning storage system will typically present and initially make available to a user what is essentially a virtual volume that appears to have a very large size. However, the physical storage area of the virtual volume is not allocated for use until the storage space of a particular portion of the volume is actually required by the user. For example, when the user writes data to a certain area of the volume (e.g., issues a write command to a logical block address) for the first time, then an actual storage extent is allocated from physical disks in the thin provisioning storage system for use in the designated portion of the volume. Thus, thin provisioning allows the efficiency of storage capacity utilization to be improved without heavy administrative overhead. When thin provisioning is incorporated, businesses are able to operate with less actual storage capacity, and defer frequent addition of storage capacity, while also reducing the operating costs associated with maintaining large amounts of unused disk capacity. US Pat. Appl. Pub. 2004/0162958, to Kano et al., entitled "Automated On-Line Capacity Expansion Method for Storage Device", filed Feb. 23, 2004, the disclosure of which is incorporated herein by reference, discloses such a storage system that includes automated on-line capacity expansion capability. This is one of the virtualization technologies which encapsulate the physical structure of the storage devices.

Trends of Disk Capacity and Disk Performance Growth

In addition to the foregoing, the capacity of hard disk drives is increasing rapidly, but the performance of these drives (i.e., the speed of data writing and retrieval) is not keeping pace with the increases in capacity. For example, studies have shown that since 1991, disk drive capacity has been increasing by an average of 60% per year. However, the performance of the disk drives has been increasing by less than 10% per year. This trend of the disproportionate growth of disk capacity relative to the slower increase in disk performance is leading to a performance bottleneck at each disk because a single disk is able to hold huge amounts of data, while the disk interface does not have enough speed to process requests to read or write this huge amount of data. Thus, when a disk holds a large amount of data, and one or more computers are trying to access the data on that disk, a decrease in response time can result as the disk interface attempts to read data from the disk or write data to the disk in response to multiple access requests. As a result, in order to ensure a particular level of performance, each disk might intentionally be used in a low utilization mode (i.e., only a portion of the disk capacity is ever used), which is inefficient and results in high disk cost and wasted capacity due to the low utilization.

Trends for Archive Data

Another forecasted trend is that the amount of archived data will continue to grow rapidly in coming years. However, at the same time, according to the forecasts of capacity growth for respective storage device types, most of the large growth will made by general purpose devices, such as SAN/DAS (storage area network/direct access storage), instead of through more advanced storage technologies such as CAS (content aware storage). Since archived data typically is not accessed very often, users will not usually require CAS features, such as the intelligent search function of CAS. Accordingly, most archive data will probably continue to be stored in general SAN devices.

Current Solutions and Their Problems

The trends of high disk capacity growth vs. low disk performance growth creates a performance bottleneck at each disk since a single disk will hold a huge amount of data, and the disk interface will not have enough speed to process multiple access requests for the data. To avoid this bottleneck the amount of data stored on a disk should not exceed the capability of the disk interface. A similar bottlenecking problem can occur on a thin provisioning storage system. Because a thin provisioning storage system encapsulates the physical structure of the device, allocated thin-provisioned storage extents might be repeatedly allocated from same disk (or a single disk array group composing a RAID), and the user does not know of or cannot control this behavior. Therefore, there is a need for an automated solution to control the allocation of storage extents of a thin provisioning storage for the respective disks. The control should maintain the allocations such that the amount of data stored on each disk is not more than the disk interface is able to handle for completing I/O operations at an appropriate performance level, while also maximizing the utilization of the available capacity of the storage devices.

BRIEF SUMMARY OF THE INVENTION

The invention eliminates performance bottlenecks at each disk device, and provides a method to address the problem of performance bottlenecks on a thin provisioning storage system. The invention ensures a certain level of performance for-data access in a thin provisioning storage system, maintains the efficiency of disk capacity utilization by filling up at least some of the areas of the disk with infrequently-accessed data, such as archive data, and notifies a storage administrator of the lack of enough free space according to a granularity of capacity usage, such as for frequent access data or infrequent access data. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 1 illustrates an exemplary hardware architecture in which the invention may be realized.

FIG. 2 illustrates an exemplary logical element structure of the invention.

FIG. 3 illustrates a data structure of a volume table.

FIG. 4 illustrates a data structure of a pool table.

FIG. 5 illustrates a data structure of an array group table.

FIG. 6 illustrates a process for writing data to an unallocated area of a thin provisioned volume.

FIG. 7 illustrates a process to generate a thin provisioned chunk taking data type into account.

FIG. 8 illustrates a continuation of the process of FIG. 7.

FIG. 9 illustrates a data structure of an array group table for use with the second embodiments.

FIG. 10 illustrates a data structure of a pool table for use with the second embodiments.

FIG. 11 illustrates a process to generate a thin provisioned chunk in the second embodiments.

FIG. 12 illustrates a continuation of the process of FIG. 11.

FIG. 13 illustrates a process to update maximum I/O usage ratio of array groups and indicting a warning.

FIG. 14 illustrates a continuation of the process of FIG. 13.

DETAILED DESCRIPTION OF THE INVENTION

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

As discussed above, the invention helps avoid performance bottlenecks at each disk device, and provides a method to address this problem on a thin provisioning storage system. Under embodiments of the invention, in a thin provisioning storage system, a portion of each disk device or array group is thin provisioned for frequently-accessed data, while the remainder of each disk device or array group is thin provisioned for infrequently-accessed data, such as archive data. The invention provides an automated solution to suppress the allocation of storage extents of thin provisioning storage for respective disk devices. The allocation is maintained so as to be within a limit for an amount of data that the disk interface is capable of handling input/output (I/O) operations (e.g., read and write operations) at an appropriate performance level. However, as low utilization of disk capacity is not an acceptable solution, the invention also achieves an efficient utilization of disk capacity.

The thin provisioning storage system of the invention may include a control means for determining from which disk device or array group to allocate a storage extent for a new thin provisioned chunk of physical storage based upon the access frequency of the data that will be written to the chunk. The storage system may maintain a table that indicates whether data stored to the volume is frequently accessed or infrequently accessed. The storage system also maintains a table which tracks a boundary capacity for the frequent access data of respective array groups. When a new storage chunk allocation is requested for a particular thin provisioned volume, the control means will first determine the data type (access frequency) of the volume to which the chunk will be allocated. If the data type of the volume is for frequent access data, then the control means will find an array group which has an enough free space within its boundary of frequent access data and carve a new storage extent from this array group. On the other hand, if the volume's data type is for infrequently accessed data (IAD), such as archive data, then the control means will find an array group that has enough free space and in which the amount of chunks already allocated for archive data does not penetrate into the boundary of frequent access data for that array group. Furthermore, during the allocation process (or independently) the control means will check the remaining capacities of the respective pool of chunks. If the remaining capacity passes the predetermined threshold, then the control means sends an alert or notification to an administrator.

An advantage of the invention is that it will ensure a certain level of data access (I/O) performance of the thin provisioning storage system. The invention also increases the efficiency of disk capacity utilization by managing the ratio of infrequently-accessed data to frequently-accessed data in each storage array group of disk device. Additionally, the invention notifies a storage administrator of a deficiency in free space according to the granularity of capacity usage, such as for frequent access data or infrequent access data. By alerting the administrator of lack of capacity for at least one type of storage data, the invention enables the administrator to add more capacity of the proper type before the storage system actually runs out of space. Further, by repeating enhancement of disks based on this alert, the disk type ratio of whole storage system can be optimized by user specific data usage. Existing storage systems have alerts that are issued when available capacity is low, but the alert of this invention also represents an impending lack of capability to maintain performance as well, which triggers the administrator to add disk devices or otherwise increase available capacity.

The thin provisioning storage system disclosed in this invention presents a thin provisioned volume to the client host which is represented as if it has a user specified full size of capacity, but the actual storage extent that has been allocated from the physical disks is only for the segments of the volume where data is actually written. Real capacity is provisioned eventually by small allocations of physical storage space which are referred to as thin provisioned chunks and which correspond to a storage extent piece carved from an array group. An array group is the logical capacity composed by plural physical disks, typically to protect data by having redundant data in the disk array group, such as by configuring a RAID group having parity data. The array group itself is usually not shown directly to the end user, but the size of storage capacity able to be allocated may be shown as a pool of thin provisioned chunks.

The invention establishes a capacity boundary for frequently accessed data within a disk device or array group. The capacity boundary for the frequent access data is the capacity at which the disk interface is able to function at an appropriate performance level. The thin provisioned chunk allocation source (i.e., array group) is based on the data access frequency expected for the stored data.

First Embodiments

FIG. 1 illustrates an example of a physical hardware architecture that may be used to implement some embodiments of the invention. The overall system consists of a storage system 100 and one or more client hosts 110. Client hosts 110 and storage system 100 are connected through a network 120. Network 120 may be any variety of network type, such as Ethernet, Fibre Channel (FC), or the like.

Storage system 100 includes a controller 101 and storage mediums 105. Controller 101 includes a CPU 102, a memory 103, and a network interface (I/F) 104. Storage mediums 105 are connected to controller 101 through a local bus, FC connection, or the like. Storage mediums 105 are hard disk drives in the preferred embodiment, but in some embodiments may be any of a variety or combination of other storage devices such as, flash memory, optical disks, tape, and so on. Each client host 110 may be a computer that includes a CPU 111, a memory 112, and a network interface 113 for communicating with storage system I/F 104 via network 120. In some embodiments, client host 110 acts as a terminal computer for the storage service user.

Logical Element Structure

FIG. 2 illustrates a software and logical element structure of some preferred embodiments. In the storage system 100, the storage mediums 105 are logically configured into a plurality of array groups 250-1 through 250-N. Thus, each array group 250 represents a logical capacity which is composed by the plural storage mediums 105 designated to that array group 250. Each array group 250 may further be configured as a RAID group. For example, each array group 250 can be composed as a RAID 5 configuration with a logical capacity of four disks for storing data and one parity disk for a total of five disks. Of course, other RAID configurations or array group configurations may also be used. Further, while the invention is described as applying to a storage system configured with array groups, the invention may also be applied to individual disk devices 105 in a storage system, and thus, the invention is not limited to use with array groups or a particular RAID configuration.

A storage extent 260 is the piece of storage capacity that is carved (allocated) from an array group. The actual size of the storage extent 260 may be dependent on the configuration of the storage system, type of storage mediums, and the like.

Each array group 250 of the invention also has an individual frequent access data (FAD) threshold 270 which is a capacity boundary that partitions the entire space of the array group 250 into a frequent access data (FAD) logical partition 281 for storing frequent access data and an infrequent access data (IAD) logical partition 282 for storing archive data and other data that has been determined to be accessed infrequently. In other words, the FAD threshold 270 quantifies a ratio according to which the total array group capacity of the array group is divided into the logical partitions 281, 282, so that a certain amount of the total group capacity of the array group is designated for FAD and the remaining amount of the total group capacity of the array group is designated for IAD. The methods for determining particular FAD thresholds 270 are discussed further below.

Any number of thin provisioned volumes 220 may be provided by storage system 100 for use by client hosts 110. As illustrated in FIG. 2, initially a thin provisioned volume 220 is essentially a virtual storage volume that is exposed to client hosts 110. Thin provisioned volume 220 is represented to client hosts 110 as if it has a full size of a predetermined capacity, but the amount of capacity that is actually allocated is equal to the number of storage extents allocated to the portion of the volume 220 where the client host has already written data, or some minimum allocation. Thus, when the client host 110 writes data to an area of volume 220 where a real storage extent is not yet allocated on the storage mediums, then the storage system will generate a new thin provisioned chunk 240 and associate the new chunk 240 with a logical segment 290 of the thin provisioned volume 220 as the real storage extent for the segment 290 of volume 220 that client host 110 writes to. As will be discussed in more detail below, the thin provisioned chunk 240 is composed of one or more storage extents 260 that are carved from array groups 250.

Under the invention, there are different types of thin provisioned volumes 220, classified by the type of data intended to be stored therein. In the embodiment illustrated in FIG. 2, the thin provisioned volumes are classified into two types, namely, a frequent access data (FAD) thin provisioned volume 220-1 used for storing data that is accessed often, and an infrequent access data (IAD) thin provisioned volume 220-2 used for storing infrequent access data, such as archive data or other data that is accessed only on an infrequent basis. There may be any number of FAD volumes 220-1 for storing various types of FAD data. Similarly, there may be any number of IAD volumes 220-2 for storing data that is determined to be accessed infrequently. Typically a user or administrator will specify the type of data to be stored in a volume 220 when the volume is created.

Generally an array group itself is not shown directly to the end user in terms of thin provisioning storage system but only the amount of size which is able to be allocated is provided as a pool 230 of thin provisioned chunks. Each respective array group has its own FAD threshold 270, which is a division between the size of physical storage capacity designated for storing frequent access data in FAD partition 281 and the size of physical storage capacity designated for infrequent access data in IAD partition 282 in each of the respective array groups 250. The actual values for the FAD threshold valued may be determined based upon a desired performance response time desired by a user and the actual performance ability of the storage devices making up the array group. The FAD threshold 270 may be specified initially by an administrator, or may be set dynamically, as discussed below in the second embodiments. Also, the used amount of each data type is recorded, and thus, the size of the pools (i.e., remaining size available for allocation) for frequent access data and for infrequent access data are respectively provided by the summation of each partition size of all the participating array groups.

Software on the Controller

Controller 101 may include one or more software modules for carrying out aspects of the invention. In a preferred embodiment, controller 101 includes a thin provisioning module 200, a volume table 500, a pool table 600 and an array group table 700. Thin provisioning module 200 is a program of the invention that provides the thin provisioning service to client hosts 110. Thin provisioning module 200 controls the reading and writing of data on the thin provisioned volumes 220 and acts to generate a new thin provisioned chunk 240 when a new chunk is needed. Under the invention, thin provisioning module 200 also automatically determines an appropriate array group 250 from which to carve a storage extent 260. The processes carried out by thin provisioning module 200 under the invention are discussed further below.

Volume table 500 holds records which show the data type (classification) of each thin provisioned volume 220, i.e., frequent access data or infrequent access data. Pool table 600 holds records which include a remaining size and alert threshold for each data type of the free chunk pools. Array group table 700 holds records of array group information to enable thin provisioning module 200 to determine an appropriate array group from which to carve a storage extent. Each of these tables is discussed further below.

Volume Table

FIG. 3 illustrates an example data structure of volume table 500. Volume table 500 includes entries for a volume ID 510, which provides identification of the thin provisioned volume, and a data type 520, which provides a classification of the type of data that the volume is used for, such as for frequent access data or infrequent access data. For instance, line 591 represents a record of a thin provisioned volume which has "Vf" as the volume ID and entry 520 indicates that "Frequent Access" data is stored to this volume. Similarly, line 592 indicates that the volume having volume ID "Vi" is used for storing "Infrequent Access Data". Volume table 500 is referred to by thin provisioning module 200 to identify the data type of a specific thin provisioned volume, such as when a new storage chunk needs to be allocated. Records on this table can be generated by thin provisioning module 200, an administrator, or a user when a user requests creation of a new thin provisioned volume. For example, volume ID may be allocated by the thin provisioning module 200 and the Data Type for the volume may be specified by the user at the time that the volume is created.

Pool Table

FIG. 4 illustrates an example data structure of pool table 600. Pool table 600 includes an entry for pool ID 610, which provides identification of the pool, an entry for data type 620, which indicates the data type classification for which the chunks contained in the pool are designated to be used, such as frequent access data or infrequent access data. Pool table 600 also includes an entry for the remaining size 630 of each pool, which is the amount of free size or unallocated capacity of thin provisioned chunks that can still be allocated for the respective data type of that pool. The remaining size 630 may be calculated from a summation of the free size of each data type partition of the respective array groups. Pool table also includes an alert threshold 640, which indicates a buffer amount that it would be undesirable for the capacity of free chunks for a specific data type to fall below. When the remaining size 630 falls below the alert threshold 640, a notification may be sent to the administrator to indicate that more capacity is needed for a particular data type. For instance, line 691 represents a record of a pool which has "Pf" as the pool ID, a data type for "Frequent Access" data, and which has "10 TB" for remaining size from which chunks may be allocated, and an alert threshold of "1 TB", which indicates that an alert will be sent to the administrator when the remaining size falls below 1 TB.

Pool table 600 is updated and referred to by thin provisioning module 200 to indicate an alert when needed. The alert threshold 640 may be predefined, or may be changed dynamically by an administrator, such as by a "configure Alert Threshold" command or by other means. Further, it should be noted that the alert threshold ensures a certain level of performance by ensuring that there is a sufficient amount of FAD capacity in the FAD pool 230-1, and provides a warning to prevent performance from deteriorating.

Array Group Table

FIG. 5 illustrates an example data structure of array group table 700 which may include an entry for each array group 250 in storage system 100. Array group table 700 includes entries for an array group ID 710, which identifies the array group, a total size 720, which indicates a total array group capacity of the array group, a frequent access data threshold 730, which indicates a capacity boundary percentage that partitions the entire array group capacity into either frequent access data or infrequent access data. Array group table 700 also includes entries for size of frequent access data 740, which is the size of frequent access data already stored in this array group, and size of infrequent access data 750, which is the size of infrequent access data already stored in this array group. For instance, line 791 in FIG. 5 represents a record of an array group which has "A1" as the array group ID, which has "4 TB" total storage capacity, which is partitioned so that "25%" of its capacity is for storing frequent access data and the remainder for storing infrequent access data, which has "400 GB" of its space currently being used to store frequent access data, and which has "1500 GB" of its space currently being used to store infrequent access data. Array group table 700 is referred to by thin provisioning module 200 to find an appropriate array group 250 from which to carve storage extents for creating a new thin provisioned chunk 240. Records on this table are generated by thin provisioning module 200 or some other means, and will be updated by thin provisioning module 200 as the values change. In embodiments where array groups are not used, disk IDs replace array group IDs 710, and the sizes and threshold are determined for each disk device.

Process to Write Data to Unallocated Area of a Thin Provisioned Volume

FIG. 6 illustrates an example of a process for writing data to an unallocated segment of a thin provisioned volume 220 executed by thin provisioning module 200 that takes into account data access frequency when allocating a storage chunk to the segment of the volume. When a client host 110 writes data to a thin provisioned volume 220, if the write request is to a segment of the volume that has not yet had data written to it, then thin provisioning module 200 will allocate one or more new thin provisioned storage chunks 240 to serve as the actual storage space for the segment specified in the still virtual portion of the thin provisioned volume 220. In a preferred embodiment each storage chunk 240 is of a fixed predetermined size in the thin provisioning storage system, so that the number of chunks 240 that need to be allocated in response to a write command is dependent on the size of the write data to be stored. Further, in the case where the write is targeted to an area of the thin provisioned volume that has not yet had actual storage space allocated, the write data may be retained in a cache such as in memory 103 while a storage chunk 240 is allocated. Alternatively, in some embodiments, the client host may merely send a write request, and then send the actual write data after the thin provisioned chunk is allocated. The steps illustrated in FIG. 6 that are carried out when a write is made to the thin provisioned volume 220 are described below.

Step 1500: Client host 110 writes data (or sends a write command) to one of the thin provisioned volumes 220 in the storage system 100.

Step 1510: Thin provisioning module 200 checks whether a thin provisioned chunk 240 has already been allocated for the specified portion of the identified thin provisioned volume 220. If a chunk 240 has already been allocated, then the allocating process set forth in steps 1520 and 1530 is skipped and the process proceeds to step 1540. If a chunk 240 has not yet been allocated for the specified portion of the volume 220, the process goes to step 1520 to generate a new chunk 230.

Step 1520: The process generates a new thin provisioning chunk 240 for the specified area of the thin provisioned volume 220 based on the data access frequency of the volume. The details of step 1520 are described further below with respect to FIGS. 7 and 8.

Step 1530: The process allocates the new thin provisioning chunk obtained in step 1520 to the segment of the thin provisioned volume where the client host wrote the data by mapping the storage extents of the allocated chunk to the segment (e.g., logical block address) of the thin provisioned volume 220.

Step 1540: The storage system executes the actual writing of the write data to the thin provisioning chunk allocated in step 1530, or to the thin provisioning chunk already allocated for the targeted segment of the volume (if steps 1520 and 1530 were skipped).

Step 1550: The storage system returns an acknowledgment of a successful write to the client host.

Process to Generate a Thin Provisioned Chunk Based on Data Access Type Classification FIGS. 7 and 8 illustrate an example of a process to generate a thin provisioned chunk 240 executed by thin provisioning module 200, corresponding to step 1520 of FIG. 6 described above. The process considers the data type classification of the volume for which the chunk will be used when generating the chunk.

Step 1600: The identifier of the targeted volume ("Volume ID") is already known from the process of FIG. 6 when the process arrives at this step. Using the "Volume ID", in step 1600 the thin provisioning module 200 determines the "Data Type" of the specified volume from the volume table 500. If the obtained "Data Type" of the targeted volume is "Frequent Access" then the process goes to step 1610; otherwise, if the obtained "Data Type" of the targeted volume is "Infrequent Access", the process goes to step 1700 (continued at FIG. 8).

Step 1610: From the array group table 700, the process selects a record for an array group that has minimum utilization of frequent access data and enough free space for carving a new chunk within the frequent access threshold boundary 270. To avoid deviation of the performance among the entire storage system this step will determine the array group having the lowest workload of frequent access data as the candidate from which to carve a new chunk of physical storage capacity. Utilization of frequent access data is calculated by the formula below, and by referring to the columns in array group table 700:

Utilization of Frequent Access Data=("Size of Frequent Access Data")/{("Total Size")×("Frequent Access Data Threshold")}

For example, the array group record shown in line 791 of FIG. 5, has "400 GB" of "Size of Frequent Access Data", "4 TB" of "Total Size", and "25%" for "Frequent Access Data Threshold". Therefore the current utilization of frequent access data for this array group is calculated to be 40%, or:

0.40=400 GB/(4000 GB×0.25)

The current utilization of frequent access data is calculated for each array group, and the array group having the lowest utilization of space allotted for frequent access data (i.e., maximum free space) may be chosen. In an alternative embodiment, the first array group located that has enough free space for carving a new chunk within the frequent access threshold boundary 270 may be chosen. The free space may be determined from array group table 700 to determine remaining capacity before the frequent access data threshold is reached. Thus, free space for storing frequent access data may be calculated by the following formula:

Free Space=(Total Size×Frequent Access Data Threshold)−Size of Frequent Access Data Thus, for line 791 in FIG. 700, the free space remaining for frequent access data is calculated to be 600 GB, or:

600 GB=(4000 GB×0.25)−400 GB

In either embodiment, in the case in which there is no array group that has enough free space of frequent access data, then the process will exit with an error; otherwise the process proceeds to step 1620.

Step 1620: The thin provisioning module 200 carves a storage extent from the array group identified in step 1610. Typically, one or more carved storage extents are equal to the size of one or more chunks 240, with each chunk having a predetermined size equal to a segment 290 of the thin provisioned volume 220.

Step 1630: Thin provisioning module 200 updates "Size of Frequent Access Data" value 740 of the selected array group record in array group table 700 by adding the size of the storage extent carved out in step 1620.

Step 1640: Thin provisioning module 200 selects the record of frequent access "Data Type" 620 from pool table 600, and reduces the "Remaining Size" value 630 by the size of the storage extent carved out in step 1620.

Step 1650: After reducing the value of "Remaining Size" in step 1640 above, thin provisioning module 200 checks whether the updated value for "Remaining Size" 630 is still larger than "Alert Threshold" value 640 of that record in pool table 600 (i.e., the record representing the pool for frequent access data). If the value for "Remaining Size" 630 is less than the "Alert Threshold" value 640, then an alert needs to be sent and the process proceeds to step 1660; otherwise, the process ends.

Step 1660: When, by allocation of a new chunk, the total free space of the frequent access data pool 230-1 goes below the minimum threshold 640, an alert, a notification, a warning or some other kind of message regarding the occurrence is sent to the administrator so as to provide warning that additional fast access data storage space will be required to maintain a desired level of performance. In response to the alert, the administrator may add more storage mediums 105 to the storage system to create one or more additional array groups to increase the frequent access data type pool, may delete unneeded frequent access data volumes from the storage system, or the like. In such a situation, the storage mediums added should have a fast disk interface so as to help increase the amount of frequent access data capacity relative to the amount of infrequent access data capacity in the system. Thus the invention is able to provide the advantage of optimizing the storage system to the user's environment by requiring more storage mediums having fast interfaces to be installed in the system when the capacity for FAD needs to be updated frequently, or alternatively, by requiring more storage mediums having lower performance interfaces optimized for storing IAD when the capacity for IAD is running out instead, as is discussed further below.

Step 1700: If the data type of the volume requiring a new chunk allocation was determined to be infrequent access data in step 1600, then in step 1700, thin provisioning module 200 needs to locate a suitable array group from which to carve a chunk for storing infrequently accessed data. To do this, the thin provisioning module 200 selects a record from array group table 700 for an array group in which the amount of "Size of infrequent Access Data" 750 is not so large as to be penetrating the frequent access data. Thus, the Size of Infrequent Access Data 750 must have a current usage within the IAD partition of infrequent access data, and must have enough free space for carving a new chunk within the IAD partition. When multiple array groups meet these criteria, the array group selected may be the first array group located having enough free space within its IAD partition. For example, in the case of record 791 for array group A1 in FIG. 5, the current size of infrequent access data is 1500 GB. The total size of the IAD partition is 0.75×4 TB, or 3000 GB. Thus, array group A1 has 1500 GB of remaining space in the IAD partition for storing infrequent access data. In the case in which there is no array group having enough free space of infrequent access data then the process will exit with an error; otherwise, the process proceeds to step 1710.

Step 1710: Thin provisioning module 200 carves a storage extent from the array group selected in step 1700.

Step 1720: Thin provisioning module 200 updates the "Size of Infrequent Access Data" value 750 of the selected array group record in array group table 700 by the size of the storage extent newly carved out in step 1710.

Step 1730: Thin provisioning module 200 selects the record of infrequent access "Data Type" 620 from pool table 600 and reduces the "Remaining Size" value 630 by the size of the newly-carved storage extent created in step 1710.

Step 1740: After reducing the value of "Remaining Size" 630 in step 1710 above, thin provisioning module 200 checks whether the updated value is still larger than "Alert Threshold" value 640 of that record (i.e., the record presenting the pool for infrequent access data). If the remaining amount 640 is less than the alert threshold, then the process proceeds to step 1750 for sending an alert; otherwise, the process ends.

Step 1750: When total free space of the infrequent access data pool falls below the alert threshold due to the allocation of a new chunk, the administrator is notified of the occurrence by an alert or other notification. In response to the alert, the administrator may add more storage mediums 105 to the storage system to create one or more additional array groups to increase the infrequent access data type pool, may delete unneeded infrequent access data volumes from the storage system, or the like. In such a situation, the storage mediums added may be of a type optimized for storing IAD, such as high capacity, lower cost disks that do not necessarily have a high performance interface. Disks having a low performance interface will have only a very small threshold for storing FAD, and thus, the installation of such disks in the system will increase the amount of capacity in the system for storing infrequent access data relative to the amount of capacity in the system for storing frequent access data. As discussed above, this produces an optimizing effect on the system to adapt the system to the specific data storage environment in which it is being used.

Second Embodiments

In the first embodiments described above, threshold or capacity boundary 270 of the frequent access data for respective array groups 250 is a fixed value which has been predefined. However it may be difficult for an administrator to determine the threshold before actually using the devices with a certain amount of frequent access data stored on them. For example, a certain desired performance level might not actually be achieved at the predefined threshold set by the administrator, or the predefined threshold might be placed too conservatively, thereby wasting capacity that could otherwise be allocated for frequent access data. Accordingly, the second embodiments of the invention include a method to determine the threshold dynamically in an automated manner based on a performance metric of each array group. By providing the automated feature of the invention for determination of the threshold, the administrator does not have to struggle to define the threshold. Furthermore, the threshold may be better optimized at an appropriate value, rather than when manually configured, since the threshold is based on the real performance metric established by specific data usage.

In the first embodiment validation of pool size deterioration is checked at the time of chunk allocation. This check is performed because the frequent access data threshold was a fixed value so that each pool size can be calculated as a fixed value as well. Thus performing the check during the allocation process was sufficient in that case. But in the second embodiment the threshold is determined by the dynamic performance metric, so in this case it is better to make the validation process an independent process from the allocation process, and then perform the validation process more frequently, rather than only at the time of allocation. Most of the components and behaviors of the second embodiments are the same as were described in first embodiments. Accordingly, the differences are described below.

Array Group Table

FIG. 9 illustrates an example data structure of array group table 800 of the second embodiments. Most of the columns are same as in array group table 700 of FIG. 5, but in array group table 800, the there is no fixed threshold for the frequent access data. Accordingly, the "Frequent Access Data Threshold" 730 is replaced by a dynamic performance metric referred to as the "Max I/O Usage Ratio" 830 of the array group.

Max I/O Usage Ratio 830 is a percentage of the time that the array group is in use (i.e., executing data I/O operations) as measured over a predetermined or specified period of time, such as over the past hour, past day, past week, etc. Thus, Max I/O Usage Ratio 830 indicates how busy the particular array group 250 is over the specified period of time. Either an average use ratio over the period of time or a maximum use ratio over time can be used to represent "how busy" the array group is over the period of time, but the illustrated embodiment uses the maximum ratio. The Max I/O Usage Ratio may be measured by the controller 101 or by other means. For instance, line 891 of array group table 800 represents a record of an array group which has a "Max I/O Usage Ratio" 830 as being "65%" over the specified time period. This value is preferably updated periodically by the process of the invention described with reference to FIGS. 13 and 14 below.

Pool Table

FIG. 10 illustrates an example data structure of a pool table 900 of the second embodiments. Basically the columns are the same as for pool table 600 of FIG. 4, with the exception that the column for "Remaining Size" 640 is eliminated. In the second embodiments, the remaining size value is effective only temporarily during a process of checking of pool size deterioration described in FIGS. 13 and 14 below, and thus there is no need for a column of persistent data in the pool table 900.

Process to Generate a Thin Provisioned Chunk

FIGS. 11 and 12 show an example process to generate thin provisioned chunk 240 of this embodiment. The process corresponds to step 1520 of FIG. 6, as discussed above with respect to the first embodiments.

Step 1800: The identifier of the target volume ("Volume ID") is already known from the process of FIG. 6 when the process arrives at this step. Using the "Volume ID", in step 1800 the thin provisioning module 200 determines the "Data Type" of the specified volume from the volume table 500. If the obtained "Data Type" is "Frequent Access", the process goes to step 1810; otherwise, if the "Data Type" is "Infrequent Access Data", the process goes to step 1900 in FIG. 12.

Step 1810: Thin provisioning module 200 selects a record from the array group table. If every record has been processed then the process proceeds to step 1860; otherwise the process proceeds to step 1820.

Step 1820: Thin provisioning module 200 calculates the "frequent access data boundary capacity" of the selected array group based on the value of the performance metric of this array group, which in the example is "Max I/O Usage Ratio" 830. During the calculation thin provisioning module 200 uses the value called "I/O Usage Ratio Limit" which is the percentage value that specifies the acceptable level of I/O performance. For example, 100% usage of disk interface would not provide an appropriate level of performance, so some reasonable percentage that shows the disk interface is not so heavily busy should be specified, such as 75% for instance. This limit value may be configured by the administrator in advance. In this second embodiment this value essentially determines the boundary of capacity of frequent access data. Because the suppression of chunk allocation will begin when Max I/O Usage Ratio of an array group got close to this limit value by the allocations of new chunks for frequent access data until that time. Frequent access data boundary capacity is calculated by the formula below, and with reference to the columns in array group table 800:

Frequent Access Data Boundary Capacity=(Size Of Frequent Access Data)×(100/Max I/O Usage Ratio)×(I/O Usage Ratio Limit)

Step 1830: Thin provisioning module 200 calculates the remaining free space for frequent access data of this array group which is calculated by:

Free Space=(Frequent Access Data Boundary Capacity)−(Size Of Frequent Access Data)

Step 1840: If the array group does not have enough free space of frequent access data to carve new chunk then the process proceeds back to step 1810; otherwise the process proceeds to step 1850.

Step 1850: The loop from step 1810 to step 1850 will check every array group to find out which array group has the lowest Max I/O Usage Ratio. Step 1850 maintains a record of which array group has the lowest Max I/O Usage Ratio that has been checked so far, and that also has enough remaining capacity from which to carve a new chunk.

Step 1860: After the loop above from steps 1810 to 1850 has completed checking of all array groups, if no valid array group has been found then ends the process by an error; otherwise the process proceeds to step 1870.

Step 1870: Thin provisioning module 200 carves a new storage extent from the selected array group selected in step 1850 as having the lowest Max I/O Usage Ratio.

Step 1880: Thin provisioning module 200 updates the "Size of Frequent Access Data" value 740 of the selected array group record by the size of carved storage extent in step 1870.

Step 1900: When the data type is determined to be infrequent access data, the process goes to step 1900 in FIG. 12. Thin provisioning module 200 select a record from the array group table 800. If every array group record has been processed then the process goes to step 1940; otherwise the process proceeds to step 1910.

Step 1910: Thin provisioning module 200 calculates "frequent access data boundary capacity" of selected array group in the same manner as described in step 1820.

Step 1920: Thin provisioning module 200 calculates the remaining free space for infrequent access data of this array group which is calculated by:

Free Space=(Total Size)−(Frequent Access Data Boundary Capacity)−(Size of Infrequent Access Data)

Step 1930: The loop from step 1900 to step 1930 will check every array group to find the array group that has the largest available space for infrequent access data. Step 1930 holds a record of which array group has the largest amount of free space for infrequent access data that has been checked so far.

Step 1940: If the selected array group selected in step 1930 does not have enough free space to carve a new chunk for storing infrequent access data, then the process ends with an error; otherwise the process proceeds to step 1950.

Step 1950: Thin provisioning module 200 carves a storage extent from the selected array group selected in step 1930.

Step 1960: Thin provisioning module 200 updates the "Size of Infrequent Access Data" value 750 of the selected array group record in array group table 800 by the size of the new storage extent carved in step 1950.

Process to Update Max I/O Usage Ratio of Array Groups and Indicate a Warning

FIG. 13 and 14 illustrate an example of a process for updating the "Max I/O Usage Ratio" value of array groups and sending a warning if needed. As discussed above, this process should be operable independently of the chunk allocation process in this embodiment. Therefore, the updating of the performance metric values and the checking for pool size deterioration can be performed more frequently, rather than only once when chunk allocation has taken place.

Step 2000: Thin provisioning module 200 selects a record from the array group table 800. If every record has already been processed, then the process goes to step 2100 in FIG. 14; otherwise the process goes to step 2010.

Step 2010: Thin provisioning module 200 gets the current I/O usage ratio value of the selected array group. This may be obtained from the controller 101, which may track the usage ratio of each array group over time.

Step 2020: Thin provisioning module 200 compares the obtained current I/O usage value with the Max I/O Usage Ratio value 830 of the selected array group selected in step 2000 from array group table 800. If current I/O usage ratio value is higher than the Max I/O Usage Ratio value 830, then thin provisioning module 200 updates the value in array group table 800 so that the new Max I/O Usage Ratio value 830 is the obtained current value.

Step 2030: Thin provisioning module 200 calculates "frequent access data boundary capacity" of selected array group as described above in step 1820 of FIG. 11.

Step 2040: Thin provisioning module 200 calculates the free space available for storing frequent access data in the selected array group as described above in step 1830 of FIG. 11.

Step 2050: Thin provisioning module 200 adds the free space size calculated in step 2040 to the variable "remaining size of frequent access data pool". This variable is calculated dynamically during this process, by initially starting with zero and by adding the free space for frequent access data calculated for each array group selected from the array group table to a running sum as the process calculates the free space for frequent access data for each array group. When all array groups have been selected and processed, the total remaining free space for frequent access data is known from the running sum total.

Step 2060: Thin provisioning module 200 calculates the free space for infrequent access data of the selected array group as described above in step 1920 of FIG. 12.

Step 2070: Thin provisioning module 200 adds the free space size for infrequent access data calculated in step 2060 to the variable "remaining size of infrequent access data pool". This variable is calculated dynamically during this process, by initially starting with zero and by adding the free space for infrequent access data calculated for each array group selected from the array group table to a running sum as the process calculates the free space for infrequent access data for each array group. When all array groups have been selected and processed, the total remaining free space for infrequent access data is known from the running sum total.

Step 2100: Thin provisioning module 200 gets the alert Threshold value 650 of the frequent access data type from the pool table 900.

Step 2110: If "remaining size of frequent access data pool" obtained in step 2050 is less than the alert threshold value 650 obtained in step 2100, then the process proceed to step 2120 for sending an alert; otherwise the process skips to step 2130.

Step 2120: When the total free space of the frequent access data pool is under the predetermined threshold, the occurrence needs to be reported to the administrator, such as with an alert, warning or other notification. In response to the alert, the administrator may add more storage devices having a high performance interface, or otherwise increase the capacity of frequent access data. Because the determination of this incident was performed using a dynamic value, the term "warning" might be more appropriate in this embodiment instead of "alert".

Step 2130: Thin provisioning module 200 gets the Alert Threshold value 650 for the infrequent access data type from the pool table 900.

Step 2140: If "remaining size of infrequent access data pool" obtained in step 2070 is less than the Alert Threshold value 650 obtained in step 2130, then the process proceeds to step 2150 for sending a warning to the administrator; otherwise the process ends.

Step 2150: When total free space of the infrequent access data pool falls below the alert threshold, the occurrence needs to be reported to the administrator, such as with a warning, alert or other notification. In response to the alert, the administrator may add more storage devices, or otherwise increase the capacity of infrequent access data.

Thus, it may be seen that the invention provides a means for maintaining storage performance in a storage system that incorporates allocation on use technology, while also ensuring a high utilization of the available storage capacity of the storage mediums. Further, the invention can also help a storage administrator to optimize the ratio of storage devices having high performance interfaces to storage device having low performance interfaces to be installed in a particular user environment having specific data usage requirements. This invention is useful in storage systems which have plural storage mediums, and particularly when the storage system structure is encapsulated to the user by a storage virtualization technology, such as thin provisioning. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of allocating physical storage space to a volume in a storage system comprising:
   receiving an input/output (I/O) request to store the write data to the volume from a host;
   in response to said I/O request, determining whether the volume is designated for storing a first data type that is accessed frequently by I/O operations or designated for storing a second data type that is accessed less frequently than the first data type; and
   allocating the physical storage space for storing the write data, said physical storage space being allocated from a first logical partition designated for storing the first data type when said volume is designated for said first data type and from a second logical partition designated for storing the second data type when said volume is designated for storing said second data type after said determining,
   wherein said physical storage space is allocated from one or more array groups, each array group being comprised of a plurality of disk devices and each array group having the same total group capacity,
   wherein said each array group is partitioned into one of said first logical partitions and one of said second logical partitions, such that a ratio of a first storage capacity of said first partition to the total group capacity is established according to a predetermined quantity,
   wherein the physical storage space is not allocated to a portion of the volume until the portion of the volume is first targeted for storing write data, and
   wherein the physical storage space is allocated from said one or more array groups based on utilization of said one or more array groups.

2. A method according to claim 1, further including steps of
   calculating a total remaining size of storage space designated for storing the first data type when the physical storage space is allocated from the first logical partition by adding together the first storage capacities of all of said first partitions of said one or more array groups; and
   sending an alert if the total remaining size is less than a predetermined alert threshold for the total remaining size for the first data type.

3. A method according to claim 1, further including steps of
   calculating a total remaining size of storage space designated for storing the second data type when the physical storage space is allocated from the second logical partition by adding together the second storage capacities of all of said second partitions of said one or more array groups; and
   sending an alert if the total remaining size is less than a predetermined alert threshold for the total remaining size for the second data type.

4. A method according to claim 1, wherein there is a plurality of said array groups and said volume is designated for storing said first data type, further including steps of
   calculating a utilization of available storage capacity in the first partition for each array group by determining a size of first data type already used in the first partition of a particular said array group and dividing the size of first data type already used by the product of the total group capacity of the particular array group and the ratio of the first capacity of said first partition to the total group capacity of the particular array group;
   comparing the calculated utilizations to determine the array group having the minimum utilization; and
   allocating said physical storage space from the array group determined to have a minimum utilization of available storage capacity in said first partition.

5. A method according to claim 1, wherein there is a plurality of said array groups and said volume is designated for storing said second data type, further including steps of
   determining an array group of said array groups from which to allocate said physical storage space by selecting an array group having a largest amount of free capacity in said second partition; and
   allocating said physical storage space from the selected array group having a largest amount of free capacity in said second partition.

6. A method according to claim 1, further including a step of
   partitioning the total group capacity of each said array group into one of said first partitions and one of said second partitions, such that a ratio of a first storage capacity of said first partition to the total group capacity is dynamically adjusted based on a measured usage of that array group for the I/O operations over a period of time.

7. A method according to claim 6, wherein there is a plurality of said array groups, and further including steps of selecting an array group of said array groups from which to allocate said physical storage space when said volume is designated for said first data type by determining and selecting an array group having a lowest said measured usage of the array group for the I/O operations over the period of time; and selecting an array group of said array groups from which to allocate said physical storage space when said volume is designated for said second data type by determining and selecting an array group having a largest amount of free capacity in said second partition.

8. A storage system, comprising:

a plurality of disk drives for providing physical storage space; and a controller for controlling input/output (I/O) operations to said disk drives, wherein said controller is configured to present a first volume type for storing a first data type that is frequently accessed by the I/O operations and a second volume type for storing a second data type that is less frequently accessed than the first data type, wherein the physical storage space is not allocated to a portion of the first or second volumes until the portion is first targeted for storing write data, wherein storage capacity of said disk drives is logically partitioned into one or more first logical partitions from which the physical storage space for storing the first data type is allocated and one or more second logical partitions from which the physical storage space for storing the second data type is allocated, wherein the controller is configured to determine whether a targeted volume targeted by the write data stores the first data type or the second data type in response to a write I/O request, wherein the controller is configured to allocate the physical storage space from one of said first logical partitions when said targeted volume is designated for said first data type and from one of said second logical partitions when said targeted volume is designated for storing said second data type after said determination, wherein said plurality of disk drives are configured into one or more array groups, each array group being comprised of a plurality of said disk drives, each said array group having the same total group capacity, wherein each said array group is logically partitioned into one of said first partitions and one of said second partitions, such that a ratio of a first capacity of said first partition to the total group capacity is a predetermined quantity, and wherein the physical storage space is allocated from said one or more array groups based on utilization of said one or more array groups.

9. The storage system according to claim 8, wherein the controller is configured to calculate a total remaining size of storage space designated for storing the first data type when the physical storage space is allocated from the first logical partition by adding together the first storage capacities of all of said first partitions of said one or more array groups; and wherein the controller is configured to send an alert if the total remaining size is less than a predetermined alert threshold for the total remaining size for the first data type.

10. The storage system according to claim 8, wherein the controller is configured to calculate a total remaining size of storage space designated for storing the second data type when the physical storage space is allocated from the second logical partition by adding together the second storage capacities of all of said second partitions of said one or more array groups; and wherein the controller is configured to send an alert if the total remaining size is less than a predetermined alert threshold for the total remaining size for the second data type.

11. The storage system according to claim 8, wherein there is a plurality of said array groups and said targeted volume is designated for storing said first data type, wherein the controller is configured to calculate a utilization of available storage capacity in the first partition for each array group by determining a size of first data type already used in the first partition of a particular said array group and dividing the size of first data type already used by the product of the total group capacity of the particular array group and the ratio of the first capacity of said first partition to the total group capacity of the particular array group, wherein the controller is configured to compare the calculated utilizations to determine the array group having the minimum utilization; and wherein the controller is configured to allocate said physical storage space from the array group determined to have a minimum utilization of available storage capacity in said first partition.

12. The storage system according to claim 8, wherein there is a plurality of said array groups and said targeted volume is designated for storing said second data type, wherein the controller is configured to determine an array group of said array groups from which to allocate said physical storage space by selecting an array group having a largest amount of free capacity in said second partition; and wherein the controller is configured to allocate said physical storage space from the selected array group having the largest amount of free capacity in said second partition.

13. The storage system according to claim 8, wherein said controller is configured to partition the total group capacity of each said array group into one of said first partitions and one of said second partitions, such that a ratio of a first storage capacity of said first partition to the total group capacity is dynamically adjusted based on a measured usage of that array group for the I/O operations over a period of time.

14. The storage system according to claim 8, wherein there is a plurality of said array groups, wherein, when said volume is designated for said first data type, the controller is configured to select an array group of said array groups from which to allocate said physical storage space by determining and selecting an array group having a lowest said measured usage of the array group for the I/O operations over the period of time, and wherein, when said volume is designated for said second data type, the controller is configured to select an array group of said array groups from which to allocate said physical storage space by determining and selecting an array group selecting an array group having a largest amount of free capacity in said second partition.

15. A method of operating a storage system, comprising:
providing a storage system having multiple disk drives and a controller for controlling access to the disk drives, said disk drives having a total physical storage capacity;
presenting a volume to a computer, whereby said computer stores data to said volume as if physical storage space on said disk drives was allocated for said volume, while at least a portion of the volume does not initially have physical storage space allocated on said disk drives;
designating a first portion of said total physical storage capacity for storing a first data type that is specified to be accessed frequently for input/output (I/O) operations and designating a second portion of said total physical capacity for storing a second data type that is specified as being accessed less frequently than the first data type;
determining total amount of said first data type stored to said disk drives for determining a remaining capacity of said first portion when a chuck is allocated in response to a write I/O request; and
sending an alert when a remaining capacity of said first portion passes a predetermined threshold so that performance of I/O operations for the first data type is maintained;
wherein a plurality of array groups are configured from said multiple disk drives, each array group being comprised of a plurality of said disk drives, each array group having the same total group capacity,
wherein each said array group is partitioned into a first logical partition that forms part of said first portion for storing said first data type and a second logical partition that forms part of said second portion for storing said second data type, such that a ratio of a first storage capacity of said first partition to the total group capacity is established according to a predetermined quantity, and
wherein the physical storage space is allocated from said one or more array groups based on utilization of said one or more array groups.

16. A method according to claim 15, further including steps of
receiving a write request from said computer, said write request being directed to a segment of said volume for which storage space on said disk drives has not yet been allocated;
determining whether said volume is designated for storing said first data type of data or said second data type; and
allocating storage space for said segment of said volume, said storage space being allocated from one of said first partitions when said volume is designated for storing said first data type or from one of said second partitions when said volume is designated for storing said second data type.

17. A method according to claim 15, further including
partitioning the total group capacity of each said array group into a first logical partition that forms part of said first portion for storing said first data type and a second logical partition that forms part of said second portion for storing said second data type, such that a ratio of a first storage capacity of said first partition to the total group capacity of said second partition is dynamically adjusted based on a measured usage of that array group for the I/O operations over a period of time.

18. A method according to claim 17, further including a step of
selecting an array group of said array groups from which to allocate said physical storage space when said volume is designated for said first data type by determining and selecting an array group having a lowest said measured usage of the array group for the I/O operations over the period of time.

19. A method of operating a storage system, comprising:
providing a storage system having multiple disk drives and a controller for controlling access to the disk drives, said disk drives having a total physical storage capacity;
presenting a volume to a computer, whereby said computer stores data to said volume as if physical storage space on said disk drives was allocated for said volume, while at least a portion of the volume does not initially have physical storage space allocated on said disk drives;
designating a first portion of said total physical storage capacity for storing a first data type that is specified to be accessed frequently for input/output (I/O) operations and designating a second portion of said total physical capacity for storing a second data type that is specified as being accessed less frequently than the first data type;
determining total amount of said first data type stored to said disk drives for determining a remaining capacity of said first portion when a chuck is allocated in response to a write I/O request; and
sending an alert when a remaining capacity of said first portion passes a predetermined threshold so that performance of I/O operations for the first data type is maintained;
configuring a plurality of array groups from said multiple disk drives, each array group being comprised of a plurality of said disk drives, each array group having a total group capacity;
partitioning the total group capacity of each said array group into a first logical partition that forms part of said first portion for storing said first data type and a second logical partition that forms part of said second portion for storing said second data type, such that a ratio of a first storage capacity of said first partition to the total group capacity of said second partition is dynamically adjusted based on a measured usage of that array group for the I/O operations over a period of time;
calculating a free capacity in the second partition for each array group as Free Capacity=Total Size of the Second Partition−(Access Data Boundary Capacity for First Data Type)−(Size of Data of the Second Data Type), wherein Access Data Boundary Capacity for First Data Type=(Size of Data of First Data Type)×(100/Max I/O Usage Ratio)×(I/O Usage Ratio Limit), where Max I/O Usage Ratio is a percentage of the time that the array group is in use for executing data I/O operations as measured over the period of time, and where I/O Usage Ratio Limit is a percentage value that specifies an acceptable level of I/O performance; and
selecting an array group of said array groups from which to allocate said physical storage space when said volume is designated for said second data type by determining and selecting an array group having a largest amount of free capacity in said second partition.

20. A method according to claim 19, wherein the I/O Usage Ratio Limit is 75%.

* * * * *